(12) United States Patent
Lee et al.

(10) Patent No.: US 6,514,113 B1
(45) Date of Patent: Feb. 4, 2003

(54) WHITE LIGHT SOURCE USING CARBON NANOTUBES AND FABRICATION METHOD THEREOF

(75) Inventors: Cheol-jin Lee, 304-1004 Hyundai 3-cha Apt., Naun 2-dong, Gunsan-city, Jeonlabuk-do (KR); Jae-eun Yoo, Seoul (KR)

(73) Assignees: Iljin Nanotech Co., Ltd. (KR); Cheol-Jin Lee (KR)

( * ) Notice: Subject to any disclaimer, the term of this patent is extended or adjusted under 35 U.S.C. 154(b) by 308 days.

(21) Appl. No.: 09/594,150

(22) Filed: Jun. 15, 2000

(30) Foreign Application Priority Data

| Jun. 15, 1999 | (KR) | 99-22415 |
| Jun. 18, 1999 | (KR) | 99-23047 |
| Jun. 2, 2000 | (KR) | 00-30355 |

(51) Int. Cl.[7] .............. H01J 9/04; H01J 9/12
(52) U.S. Cl. ............ 445/50; 445/51; 445/24; 313/495
(58) Field of Search ............ 313/495, 496, 313/497, 309, 311, 336, 351; 445/24, 50, 51

(56) References Cited

U.S. PATENT DOCUMENTS

| 5,698,175 | A | | 12/1997 | Hiura et al. | 423/447.1 |
| 5,729,087 | A | * | 3/1998 | Chien | 313/309 |
| 5,773,921 | A | | 6/1998 | Keesmann et al. | 313/309 |
| 6,019,656 | A | | 2/2000 | Park et al. | 445/24 |
| 6,062,931 | A | * | 5/2000 | Chuang et al. | 445/50 |
| 6,100,628 | A | * | 8/2000 | Coll et al. | 313/310 |
| 6,146,227 | A | * | 11/2000 | Mancevski | 445/24 |
| 6,232,706 | B1 | * | 5/2001 | Dai et al. | 313/309 |
| 6,350,488 | B1 | * | 2/2002 | Lee et al. | 427/249.1 |
| 2001/0006869 | A1 | * | 7/2001 | Okamoto et al. | 445/24 |
| 2001/0007783 | A1 | * | 7/2001 | Lee et al. | 438/154 |

FOREIGN PATENT DOCUMENTS

| DE | 196 92 595 | 1/1997 |
| EP | 0 351 110 | 1/1990 |
| EP | 0 905 737 | 3/1999 |
| EP | 0 913 508 | 5/1999 |
| EP | 0 989 579 | 3/2000 |
| JP | 5-133048 | 5/1993 |
| JP | 8-12310 | 1/1996 |
| KR | 1999-030320 | 4/1999 |
| WO | 94/28571 | 12/1994 |
| WO | 97/07531 | 2/1997 |
| WO | 97/18577 | 5/1997 |
| WO | 98/44526 | 10/1998 |
| WO | 99/66523 | 12/1999 |

OTHER PUBLICATIONS

C. Journet et al., "Large–scale production of single–walled carbon nanotubes by the electric–arc technique," Nature, vol. 388, Aug. 21, 1977, pp. 756–758.

(List continued on next page.)

*Primary Examiner*—Kenneth J. Ramsey
*Assistant Examiner*—Mariceli Santiago
(74) *Attorney, Agent, or Firm*—Burns, Doane, Swecker & Mathis, LLP

(57) ABSTRACT

A white light source using carbon nanotubes and a fabrication method thereof are provided. The white light source includes a metal film which is formed on a lower substrate and used as a cathode, a catalytic metal film formed on the metal film, carbon nanotubes which are vertically aligned on the catalytic metal film for emission of electrons in an applied electric field, spacers mounted on the catalytic metal film, and a transparent upper substrate which has a transparent electrode for an anode and a fluorescent body on the transparent electrode, and which is mounted on the spacers such that the fluorescent body faces the carbon nanotubes. The catalytic metal film is composed of isolated nano-sized catalytic metal particles. The carbon nanotubes are grown from each of the catalytic metal particles to be vertically aligned on the substrate by chemical vapor deposition.

10 Claims, 4 Drawing Sheets

OTHER PUBLICATIONS

D.S. Bethune et al., "Cobalt–catalysed growth of carbon nanotubes with single–atomic–layer walls," Nature, vol. 363, Jun. 17, 1993, pp. 605–607.

A. Thess et al., "Crystalline Ropes of Metallic Carbon Nanotubes," Science, vol. 273, Jul. 26, 1996, pp. 483–487.

R. Andrews et al., "Continuous production of aligned carbon nanotubes: a step closer to commercial realization," Chemical Physics Letters, Apr. 16, 1999, pp. 467–474.

W.Z. Li et al., "Large–scale Synthesis of Aligned Carbon Nanotubes," Science, vol. 274, Dec. 6, 1996, p. 1701–1703.

Kingsuk Mukhopadhyay et al., "A Simple and Novel Way to Synthesize Aligned Nanotube Bundles at Low Temperature," Japan J. Appl. Phys., vol. 37 Part 2, No. 10B, Oct. 15, 1998, pp. L1257–L1259.

Z.F. Ren et al., "Synthesis of Large Arrays of Well–Aligned Carbn Nanotubes on Glass," Science, vol. 282, Nov. 6, 1998, pp. 1105–1107.

M. Kusunoki et al., "Epitaxial carbon nanotube film self–organized by sublimation decomposition of silicon carbide," Appl. Phys. Lett., vol. 71, No. 18, Nov. 3, 1977, pp. 2620–2622.

S. Iijima, "Helical microtubules of graphitic carbon," Nature, Vol. 354, Nov. 7, 1991, pp. 56–58.

S. Kanemaru et al., "Active Matrix of Si Field Emitters Driven by Built–in Mosfets," IDW '97, pp. 735–738, 1997.

H. Gamo et al., "Actively–Controllable Field Emitter Arrays with Built–in Thin Film Transistors on Glass For Active–Matrix FED Applications," IDW '98, pp. 667–670, 1998.

\* cited by examiner

WHITE LIGHT SOURCE USING CARBON NANOTUBES AND FABRICATION METHOD THEREOF

This application claims priority under 35 U.S.C. §§119 and/or 365 to 99-22415 filed in Republic of Korea on Jun. 15, 1999; 99-23047 filed in Republic of Korea on Jun. 18, 1999; and 00-30355 filed in Republic of Korea on Jun. 2, 2000, the entire contents of which are hereby incorporated by reference.

BACKGROUND OF THE INVENTION

1. Field of the Invention

The present invention relates to a white light source, and more particularly, to a method of manufacturing a white light source having an excellent luminous efficacy.

2. Description of the Related Art

A representative white light source is a fluorescent lamp. The fluorescent lamp uses the emission of light by a fluorescent body due to a discharge effect. This fluorescent lamp has the drawback of low luminance. Moreover, it is difficult to miniaturize the fluorescent lamp and lower operating voltage in the fluorescent lamp. In addition, as use time lapses, the luminance of the fluorescent lamp decreases. Consequently, the stability and reliability of the fluorescent lamp are degraded, and the life span is short.

SUMMARY OF THE INVENTION

To solve the above problems, a feature of the present invention is to provide a white light source having an excellent electron emission efficiency in an applied electric field to thereby obtain a large emission current even at a low applied voltage, and having a very high density of electron emitters per unit area to thereby exhibit excellent luminance, and a fabrication method thereof.

In order to achieve the above feature, the present invention provides a white light source including a metal film used as a cathode, the metal film being formed on a lower substrate, a catalytic metal film formed on the metal film, carbon nanotubes for emission of electrons in an applied electric field, the carbon nanotubes being vertically aligned on the catalytic metal film, spacers mounted on the catalytic metal film, and a transparent upper substrate to which a transparent electrode to be used as an anode is attached, to which the transparent electrode a fluorescent body is attached, the transparent upper substrate being mounted on the spacers such that the fluorescent body faces the carbon nanotubes.

The catalytic metal film may be composed of isolated nano-sized catalytic metal particles, and the carbon nanotubes may be vertically grown from each of the catalytic metal particles by chemical vapor deposition. Here, the catalytic metal film may be formed of cobalt, nickel, iron, yttrium or an alloy of at least two of them, and the fluorescent body may be formed of $(3Ca_3(PO_4)_2CaFCl/Sb,Mn)$, generating a white luminescence, or a combination of $Y_2O_3$:Eu, CeMaA$_{11}$O$_{19}$:Tb and BaMg$_2$Al$_{16}$O$_7$:Eu, to generate a white luminescence by combining different emission spectrums.

The white light source may further includes an insulation film pattern having openings selectively exposing the catalytic metal film. The carbon nanotubes are selectively located on the portions of the catalytic metal film exposed through the openings. The spacers may be mounted on the insulation film pattern.

The present invention also provides a method of fabricating a white light source. A metal film used as a cathode is formed on a lower substrate. A catalytic metal film is formed on the metal film. Carbon nanotubes for emission of electrons in an applied electric field are grown to be vertically aligned on the catalytic metal film. A spacer is mounted on the catalytic metal film. A transparent upper substrate having a transparent electrode having a fluorescent body is mounted on the spacer such that the fluorescent body faces the carbon nanotubes, and the transparent upper substrate is sealed with the lower substrate.

A reaction preventing film may also be formed using an insulating material to prevent reaction between the lower substrate and the metal film, before the step of forming the metal film. Here, the catalytic metal film is formed by depositing the catalytic metal film and etching the deposited catalytic metal film to separate the catalytic metal film into nano-sized catalytic metal particles. The carbon nanotubes are grown from each of the catalytic metal particles to be vertically aligned on the substrate by chemical vapor deposition.

For the catalytic metal film, cobalt, nickel, iron, yttrium or an alloy of at least two of them may be used. An insulation film pattern having openings selectively exposing the catalytic metal film may also be formed on the catalytic metal film. Here, the carbon nanotubes are selectively located on the portions of the catalytic metal film exposed through the openings, and the spacers may be mounted on the insulation film pattern.

The present invention can provide a white light source, which can be extremely miniaturized to be portable, and which has high efficiency and a power saving effect.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Figure 1:
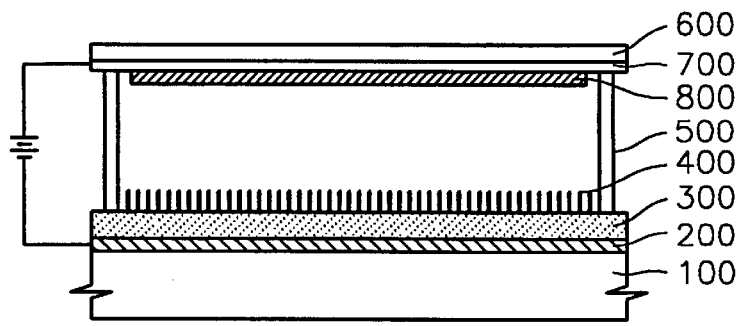
FIG. 1 is a schematic sectional view for explaining a white light source according to a first embodiment of the present invention.

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art. In the drawings, the shapes of the members are exaggerated for clarity and the same reference numerals denote the same members. Also, when a film is described as being on another film or a semiconductor substrate, it can be directly on the other layer or the semiconductor substrate or an interlayer film can exist therebetween.

The present invention provides a white light source using carbon nanotubes and a method of fabricating the same. It is known that a carbon nanotube is microscopically constituted such that a single carbon element is combined with three neighboring carbon atoms, a hexagonal ring is formed by the combination of the carbon atoms, and a plane composed of repeated hexagonal rings like a honeycomb is rolled to thereby form a cylindrical shape. The cylindrical structure is characterized by the diameter usually being several nanometers through several tens of nanometers, and the length being several tens through several thousands of times longer than the diameter.

Accordingly, the tip of a carbon nanotube has a diameter of several nanometers through several tens of nanometers, thereby realizing very high electron emission efficiency in an applied electric field. Therefore, a large amount of emission current can be obtained at a low applied voltage. In addition, carbon nanotubes can be grown with a very high density of nanotubes per unit area so that a very high tip density can be achieved, thereby obtaining excellent luminous efficacy.

The present invention will now be described more fully with reference to the accompanying drawings, in which preferred embodiments of the invention are shown.

FIG. 1 is a schematic sectional view for explaining a white light source according to a first embodiment of the present invention. Referring to FIG. 1, the white light source according to the first embodiment of the present invention includes a metal film 200 used as a cathode on a lower substrate 100, and a catalytic metal film 300 on the metal film 200.

The lower substrate 100 may be formed on silicon (Si), alumina ($Al_2O_3$), quartz or glass, but it is preferable that the lower substrate 100 is formed of glass, which is suitable for a sealing process of completing a white light source. The metal film 200 may be formed of a conductive material, for example, chrome (Cr), titanium (Ti), nitride titanium (TiN), tungsten (W) or aluminum (Al).

The catalytic metal film 300 is used as a catalyst when vertically aligned carbon nanotubes 400 are formed thereon. The catalytic metal film 300 is formed of a metal material serving as a catalyst for synthesizing and growing the carbon nanotubes 400. For example, the catalytic metal film 300 may be formed of cobalt (Co), nickel (Ni), iron (Fe), yttrium (Y) or an alloy of at least two among them (for example, cobalt-nickel, cobalt-iron, cobalt-yttrium, nickel-iron, cobalt-iron or cobalt-nickel-yttrium).

The vertically aligned carbon nanotubes 400 are disposed on the catalytic metal film 300. The carbon nanotubes 400 can be vertically grown from a carbon source which is applied to the catalytic metal film 300 by a chemical vapor deposition method. The growth of the carbon nanotubes 400 by the chemical vapor deposition method will later be described in detail with reference to FIGS. 6 through 10.

The carbon nanotubes 400 are provided for electron emission in an applied electric field. Accordingly, a fluorescent body 800 is provided to face the tips of the carbon nanotubes 400 at a distance from the carbon nanotubes 400. A transparent electrode 700 is provided on the back of the fluorescent body 800. An upper substrate 600 to which the transparent electrode 700 is attached is mounted on spacers 500 and vacuum sealed with the lower substrate 100.

The transparent electrode 700 may be formed of a transparent conductive material such as indium tin oxide (ITO). The fluorescent body 800 may be formed of a fluorescent material, for example, ($3Ca_3(PO_4)_2CaFCl/Sb,Mn$), generating a white luminescence, or a combination of fluorescent materials including, for example, $Y_2O_3$:Eu, $CeMaA_{11}O_{19}$:Tb and $BaMg_2Al_{16}O_7$:Eu, to generate a white luminescence by combining different emission spectrums. The upper substrate 600 is formed of a transparent material, for example, glass, to pass out the light emitted from the fluorescent body 800.

In the white light source having such configuration, when an electric field is introduced between the metal film 200 used as a cathode and the transparent electrode 700 used as an anode, the electric field is concentrated from the tips of the carbon nanotubes 400 toward the transparent electrode 700 so that electrons are emitted. Since the diameter of the tip of each carbon nanotube 400 is very small, for example, several nanometers through several tens nanometers, compared to the length of the carbon nanotube 400, electrons can be very effectively emitted from the tips.

Accordingly, an electric field introduced between the metal film 200 and the transparent electrode 700 can be lowered. In other words, even if low voltage is applied to the metal film 200 or the transparent electrode 700, a very high electric field concentration can be formed at the tips of the carbon nanotubes 400 so that very effective emission of electrons can be achieved. In addition, since the carbon nanotubes 400 can be grown with a very high number density, the density of electrons, which are emitted from the carbon nanotubes 400 aligned at a high density, is very high. Consequently, emission current is large.

The emitted electrons strike the fluorescent body 800 and make the fluorescent body 800 radiate light. The radiated light is discharged out through the transparent substrate 600. Here, as described above, since the electron emission efficiency is high and the emission current due to the emitted electrons is also high, the density of the electrons striking the fluorescent body 800 is very large. Accordingly, the amount of light generated by the fluorescent body 800 is very high.

Although the white light source according to the first embodiment of the present invention is substantially simple and compact, it can emit monochromatic light of very high luminance, as described above. In addition, since it has a high electron emission efficiency in an electric field, it can operate with very small voltage or very low current. Accordingly, this white light source can be used as a general illumination system, and if it is extremely miniaturized, it can be used as a portable illumination system.

With reference to FIGS. 2 through 5, an embodiment of a method of fabricating the white light source according to the first embodiment of the present invention will be described in detail.

Figure 2:
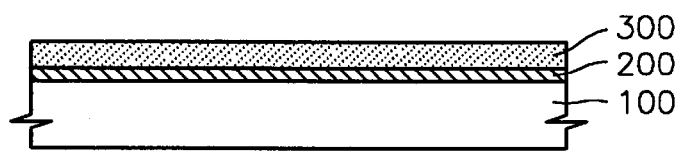
FIG. 2, as part of the group of FIGS. 2–5, is schematic sectional view for explaining a method of fabricating a white light source according to the first embodiment of the present invention.

FIG. 2 schematically shows the step of forming the metal film 200 and the catalytic metal film 300 on the lower substrate 100. The metal film 200, used as a cathode, is thinly formed on the lower substrate 100, which has a large area for mass production. The lower substrate 100 may be formed of various materials, as described above, but is preferable that it is formed of glass. The metal film 200 is formed by depositing a conductive material, for example, chrome, titanium, nitride titanium, tungsten, or aluminum, to a thickness of about 0.3–0.5 $\mu$m. The deposition is performed by a method of forming a thin film, such as a thermal deposition method or a sputtering method.

The catalytic metal film 300, which serves as a catalyst when growing the carbon nanotubes 400, is formed on the metal film 200. The catalytic metal film 300 is deposited to a thickness of about several nanometers through several hundreds of nanometers, preferably, about 2–200 nm. The deposition may be performed by a method of forming a thin film, such as a thermal deposition method or a sputtering method.

Figure 3:
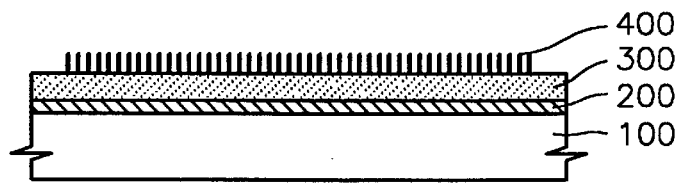
FIG. 3, as part of the group of FIGS. 2–5, is schematic sectional view for explaining a method of fabricating a white light source according to the first embodiment of the present invention.

FIG. 3 schematically shows the step of growing the carbon nanotubes 400 on the catalytic metal film 300. The catalytic metal film 300 is processed such that it can serve as a catalyst for growing a plurality of carbon nanotubes 400 to be spaced from one another and vertically aligned on the catalytic metal film 300. For example, the surface of the catalytic metal film 300 is grain boundary etched to separate the catalytic metal film 300 into fine isolated catalytic metal particles. Accordingly, the surface of the underlying metal film 200 is exposed between the isolated catalytic metal particles. As a result, the catalytic metal film 300 is constituted by the isolated catalytic metal particles distributed independently.

Thereafter, a carbon source is provided on the catalytic metal film 300 to grow the carbon nanotubes 400 from individual catalytic metal particles. Since the catalytic metal particles are formed by grain boundary etching, the size of each catalytic metal particle can be adjusted depending on the thickness of the initial catalytic metal film 300 and the grain boundary etching rate. The diameter of each carbon nanotube 400 grown from each catalytic metal particle can also be adjusted by adjusting the size of the catalytic metal particles. In addition, since the catalytic metal particles formed by the grain boundary etching are uniformly arranged, the grown carbon nanotubes 400 are also arranged in lines.

Here, the carbon nanotubes 400 can be grown using a thermal or plasma chemical vapor deposition method. Growing the carbon nanotubes 400 using a chemical vapor deposition method will later be described in detail with reference to FIGS. 6 through 10.

Figure 4:
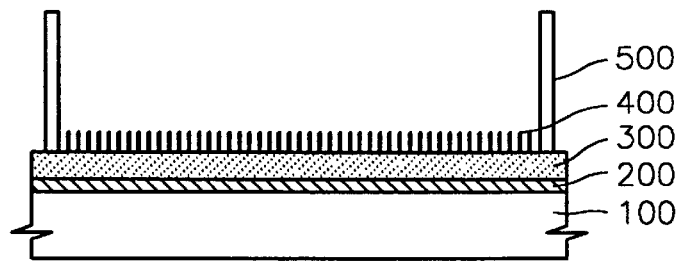
FIG. 4, as part of the group of FIGS. 2–5, is schematic sectional view for explaining a method of fabricating a white light source according to the first embodiment of the present invention.

FIG. 4 schematically shows the step of installing the spacers 500 on the catalytic metal film 300. A plurality of spacers 500 having a length of about 100–700 $\mu$m are installed on the catalytic metal film 500. The spacers 500 have a function of separating the fluorescent body (800 of FIG. 1), which will later be provided, from the tips of the carbon nanotubes 400 by a predetermined distance.

Figure 5:
FIG. 5, as part of the group of FIGS. 2–5, is schematic sectional view for explaining a method of fabricating a white light source according to the first embodiment of the present invention.

FIG. 5 schematically shows the step of forming the transparent electrode 700 and the fluorescent body 800 on the transparent upper substrate 600. The transparent electrode 700, used as an anode, is attached to the transparent upper substrate 600, for example, a glass substrate. The transparent electrode 700 is formed of a transparent conductive material such as ITO. Thereafter, the fluorescent body 800 is attached to the transparent electrode 700. The fluorescent body 800 may be formed of a fluorescent material, for example, $(3Ca_3(PO_4)_2CaFCl/Sb,Mn)$, generating a white luminescence, or a combination of fluorescent materials including, for example, $Y_2O_3$:Eu, $CeMaA_{11}O_{19}$:Tb and $BaMg_2Al_{16}O_7$:Eu, to generate a white luminescence by combining different emission spectrums.

The upper substrate 600 having the fluorescent body 800 and the transparent electrode 700 is mounted on the spacers 500 such that the surface of the fluorescent body 800 faces the tips of the carbon nanotubes 400. Thereafter, the transparent upper substrate 600 and the lower substrate 100 are vacuum sealed.

For the carbon nanotubes 400 of the white light source fabricated through the above steps, the diameter of each tip is very small at several nanometers through several tens of nanometers, so that emission of electrons in an applied electric field can be achieved with very high efficiency even with very low applied voltage.

With reference to FIGS. 6 through 10, a method of growing the carbon nanotubes 400 in fabricating the white light source according to the present invention will be described in detail.

Figure 6:
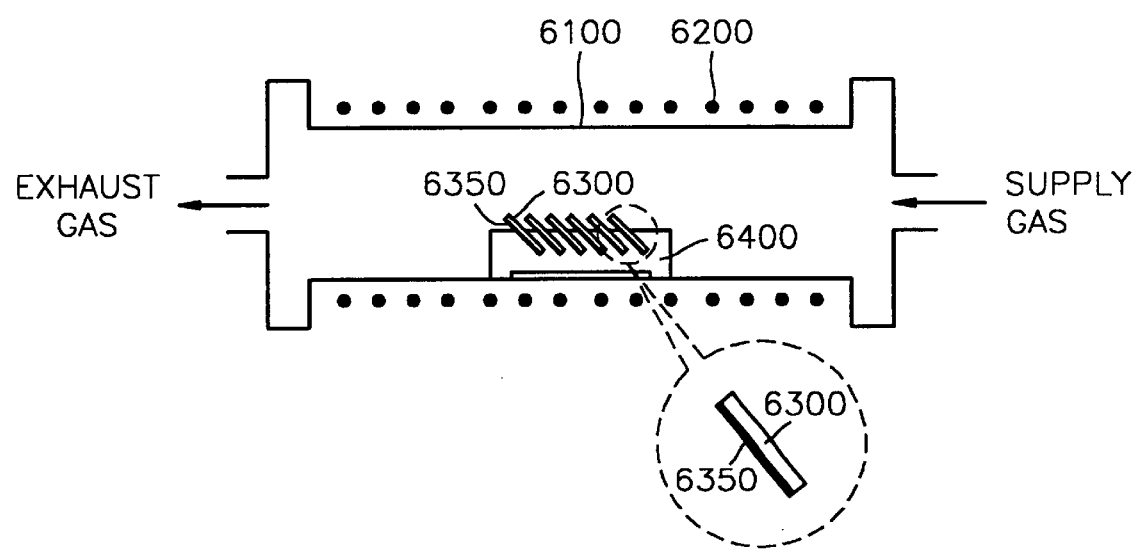
FIG. 6 is a schematic sectional view for explaining a thermal chemical vapor deposition apparatus which is used for growing carbon nanotubes according to the present invention.

FIG. 6 schematically shows a thermal chemical vapor deposition apparatus which is used for growing the carbon nanotubes 400 according to the present invention. FIGS. 7 through 10 are schematic sectional views for explaining the growth of carbon nanotubes according to the present invention.

Briefly, the vertically aligned carbon nanotubes 400 shown in FIG. 3 can be grown as shown in FIGS. 7 through 10 using a thermal chemical vapor deposition apparatus as shown in FIG. 6. Hereinafter, an example of growing the carbon nanotubes 400 to be vertically aligned using thermal chemical vapor deposition will be explained, but a chemical vapor deposition method using plasma can also be used to grow the carbon nanotubes 400 to be vertically aligned.

Figure 7:
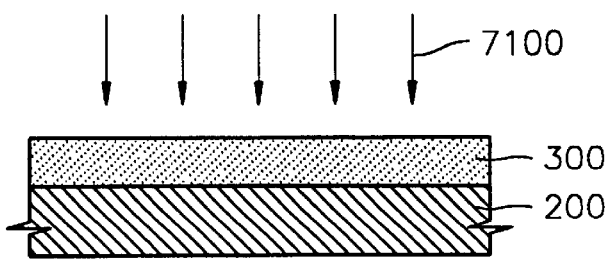
FIG. 7, as part of the group of FIGS. 7–10, is schematic sectional view for explaining the growth of carbon nanotubes according to the present invention.

Referring to FIG. 7, as described above, the metal film 200 and the catalytic metal film 300 are formed on the lower substrate (100 of FIG. 3) having a large area. The catalytic metal film 300 is formed to have a thickness of several nanometers through several hundreds of nanometers, preferably, 2–200 nm.

A substrate 6300, on which the catalytic metal film 300 is formed as described above, is mounted on a quartz boat 6400 and then loaded into a reaction furnace 6100 of a thermal chemical vapor deposition apparatus as shown in FIG. 6. Here, the substrate 6300 is mounted on the quartz boat 6400 such that the surface 6350, on which the carbon nanotubes 400 will be formed, faces away from the direction in which a gas is supplied, and slightly down. This is for preventing impurities or residuals from adhering to the surface 6350, on which the carbon nanotubes 400 will be grown, and for making the flow of the reactive gas, which is supplied to the surface 6350, uniform.

Here, the pressure within the reaction furnace 6100 is maintained at atmospheric pressure or several hundreds of mTorr through several Torr. After increasing the temperature of the reaction furnace 6100 using a heating unit such as a resistance coil 6200, an etching gas such as ammonia ($NH_3$) gas, which allows grain boundary etching of the catalytic metal film 300, is injected into the reaction furnace 6100. Since the etching gas has a function of etching the catalytic metal film 300 along the grain boundaries of the catalytic metal film 300, the step of giving a reactivity to the etching gas is required. For this purpose, it is preferable that the ammonia gas is decomposed before it reaches the substrate 6300 mounted on the quartz boat 6400 in the reaction furnace 6100.

The decomposition of the ammonia gas is performed by pyrolysis in the case of using a thermal chemical vapor deposition apparatus as shown in FIG. 6. Accordingly, it is preferable that the reaction furnace 6100 is maintained at least at a temperature which is enough to pyrolyze the ammonia gas, for example, above 700 C. Preferably, the reaction furnace 6100 is maintained at a temperature of about 700–1000° C.

Figure 8:
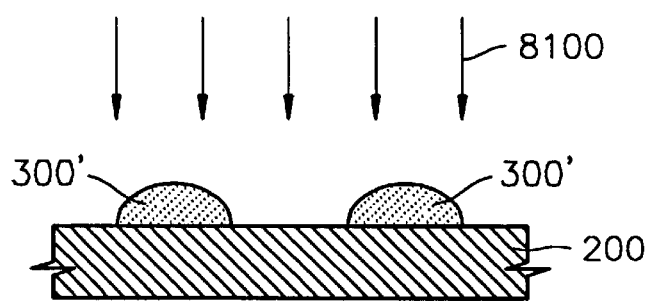
FIG. 8, as part of the group of FIGS. 7–10, is schematic sectional view for explaining the growth of the carbon nanotubes according to the present invention.

Referring to FIGS. 7 and 8, the ammonia gas 7100 having reactivity etches the surface grain boundaries of the catalytic metal film 300. It is preferable that the grain boundary etching is performed until the underlying metal film 200 is exposed. As a result, catalytic metal particles 300', which are separated from each other, are formed as shown in FIG. 8. Each of the catalytic metal particles 300' is nano-sized (several nm through several hundreds nm). The sizes of the catalytic metal particles 300' can be adjusted by adjusting the thickness of the initial catalytic metal film 300, the amount of ammonia gas supplied during the grain boundary etching, temperature during the etching process or time for the etching process.

The independently isolated nano-sized catalytic metal particles 300' are formed by etching the catalytic metal film 300 along the grain boundaries so that they can be microscopically distributed on the underlying metal film 200 with a uniform density. The sizes and shapes of the isolated nano-sized catalytic metal particles 300' vary with etching conditions. In an embodiment of the present invention, the catalytic metal particles 300' are preferably formed to have a size of 20–60 nm.

Meanwhile, when the grain boundary etching is performed on the catalytic metal film 300 at a temperature of about 700–1000° C. as described above, deformation of the lower substrate (100 of FIG. 3) may happen when the lower substrate 100 is formed of glass. To prevent this deformation, ammonia gas may be decomposed at a temperature of about 700–1000° C., and the decomposed ammonia gas 7100 may be injected into the reaction furnace 6100. Here, the reaction furnace 6100 is preferably maintained at a temperature which is higher than temperatures at which the carbon nanotubes 400 can be grown and lower than the temperature at which glass deforms, for example, a temperature of about 450–650° C.

Alternatively, in the case where ammonia gas is directly injected into the reaction furnace 6100, deformation of the lower substrate 100 formed of glass can be prevented by defining two temperature zones within the reaction furnace 6100. For example, the beginning portion where the ammonia gas is injected is defined as a first temperature zone where the temperature is maintained at about 700–1000° C., and the portion at which the quartz boat 6400 is mounted is defined as a second temperature zone where the temperature is maintained at about 450–650° C. Ammonia gas injected into the reaction furnace 6100 is decomposed while passing through the first temperature zone so that the decomposed ammonia gas 7100 can be applied to the catalytic metal film 300 located in the second temperature zone.

An example of using ammonia gas as a grain boundary etching gas has been described, but hydrogen gas or a hydride gas may be used. However, it is preferable to use ammonia gas as an etching gas. Ammonia gas is injected into the reaction furnace 6100 at a flow rate of about 80 standard cubic centimeters per minutes (sccm) for about 10–30 minutes.

Referring to FIG. 8, once the catalytic metal particles 300' are formed, the injection of decomposed ammonia gas 7100 is stopped, and a carbon source 8100 is injected into the reaction furnace 6100 to reach the catalytic metal particles 300'. A hydrocarbon gas providing carbon dimers may be used as the carbon source 8100. A hydrocarbon gas containing less than about 20 carbon atoms per molecule, for example, acetylene gas, ethylene gas, propylene gas, profane gas or methane gas, can be used.

Hydrogen or an inert gas such as argon gas may be injected as a carrier gas into the reaction furnace 6100 together with the carbon source. In addition, for example, a hydride gas may be injected as a dilutant gas into the reaction furnace 6100 together with the carbon source. Moreover, an etching gas of an appropriate ratio, for example, ammonia gas, hydrogen gas or hydride gas, may be supplied together with the carbon source gas, thereby controlling the synthesizing reaction of the carbon nanotubes 400.

It is preferable that the inside of the reaction furnace 6100 is maintained at a temperature at which a carbon source can be pyrolyzed, for example, a temperature of about 450–1000°. As described above, when the lower substrate 100 is formed of glass, a zone where the quartz boat 6400 is located is maintained at a temperature of about 450–650° C. to prevent deformation of the lower substrate 100. Here, a carbon source, for example, acetylene gas, may be supplied at a flow rate of 20–200 sccm for 10–60 minutes.

Figure 9:
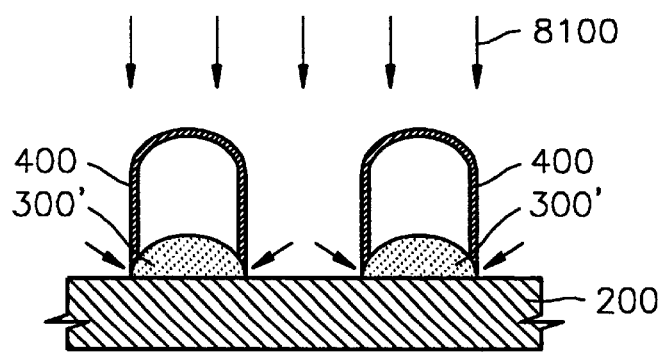
FIG. 9, as part of the group of FIGS. 7–10, is schematic sectional view for explaining the growth of the carbon nanotubes according to the present invention.

The carbon source, which is injected into the reaction furnace 6100 in a thermal chemical vapor deposition apparatus as shown in FIG. 6, is pyrolyzed to form carbon units (e.g., $C_2H_2$). The carbon units formed by pyrolysis contact the surfaces of the isolated nano-sized catalytic metal particles 300', as shown in FIG. 9, and sorb over the surfaces of the catalytic metal particles 300' or diffuse into the catalytic metal particles 300'. Here, when the carbon units contact the surfaces of the catalytic metal particles 300', the carbon units are transformed into carbon dimers ($C_2$) generating hydrogen gas ($H_2$).

The carbon dimers sorb over the surfaces of the catalytic metal particles 300' or diffuse into the catalytic metal particles 300'. When each of the catalytic metal particles 300' is supersaturated with the carbon dimers, the carbon dimers react with one another, thereby forming repeated hexagonal rings like a honeycomb in a two-dimensional view. Thereafter, when supply of the carbon dimers to the catalytic metal particles 300' is continued, a wall of a honeycomb structure grows from the edge of a catalytic metal particle 300'. This growth is continued, thereby forming a carbon nanotube 400 grown from the catalytic metal particle 300'. Substantially, the carbon dimers are supplied to the edges of the catalytic metal particles 300' so that the carbon nanotubes 400 can be grown. When the density of each catalytic metal particle 300' is high enough, the carbon nanotubes 400, which are grown from the plurality of catalytic metal particles 300', push one another back, thereby growing to be vertically aligned.

Figure 10:
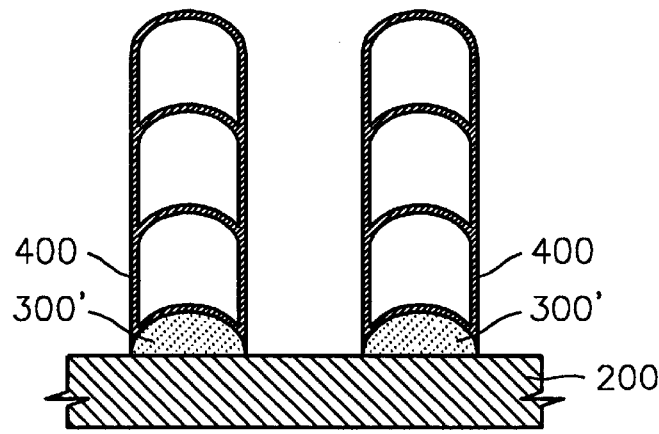
FIG. 10, as part of the group of FIGS 7–10, is schematic sectional view for explaining the growth of carbon nanotubes according to the present invention.

Meanwhile, the growth of the carbon nanotubes 400 is continued, and the carbon nanotubes 400 may have a bamboo structure, as shown in FIG. 10.

The catalytic metal particles 300' suitable for growth of the carbon nanotubes 400 are not agglomerated with other peripheral catalytic metal particles 300' but are independently formed to be isolated so that the carbon nanotubes 400 are not agglomerated but are independently formed. In other words, amorphous carbon agglomerations are not formed while the carbon nanotubes 400 are being formed. Accordingly, carbon nanotubes 400 of a high degree of purity can be obtained, and the carbon nanotubes 400 can be made to be vertically aligned on the lower substrate 100. In addition, the length of the carbon nanotubes 400 can be conveniently adjusted by changing a supply condition of the carbon source, for example, a gas flow rate, reaction temperature or reaction time.

In this embodiment described above, the isolated nano-sized catalytic metal particles are formed by a dry etching method using the thermal chemical vapor deposition apparatus of FIG. 6, but they can be formed by a wet etching method. In other words, a substrate having a catalytic metal film could be dipped into a wet etchant, for example, hydrogen fluoride (HF) diluted with water, to form isolated nano-sized catalytic metal particles. When using the wet etching method, the isolated catalytic metal particles can also be formed at a low temperature.

In the embodiment, a horizontal type thermal chemical vapor deposition apparatus is used when growing the catalytic metal particles and carbon nanotubes, but a vertical type, in-line type or conveyor type thermal chemical vapor deposition apparatus can be used. In addition, a plasma chemical vapor deposition apparatus can be used. When using the plasma chemical vapor deposition apparatus, the process can be performed at a low temperature, and reaction can be easily adjusted.

Figure 11:
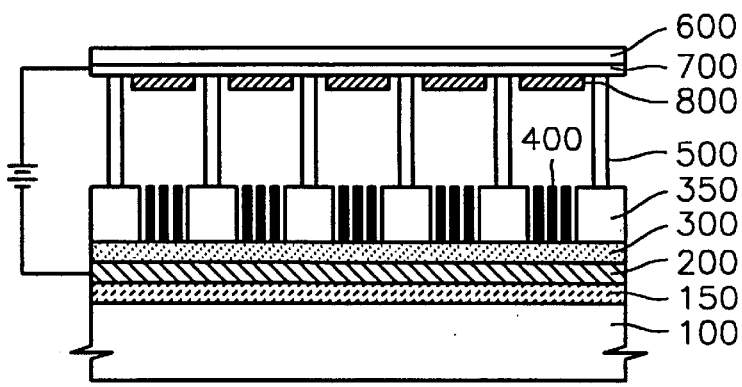
FIG. 11 is a schematic sectional view for explaining a white light source according to a second embodiment of the present invention.

FIG. 11 is a schematic sectional view for explaining a white light source according to a second embodiment of the present invention. In the first and second embodiments, the same reference numerals denote the same member.

The white light source according to the second embodiment of the present invention includes a metal film 200 used as a cathode on a lower substrate 100 and a catalytic metal film 300 on the metal film 200. A reaction preventing film 150 formed of an insulating material such as silicon oxide or alumina may further be provided between the metal film 200 and the lower substrate 100. The reaction preventing film 150 prevents reaction between the lower substrate 100 and the metal film 200, and is formed of an insulating material such as silicon oxide, to a thickness of about 0.3–0.5 μm.

A catalytic metal film 300 is formed on the metal film 200. An insulation film pattern 350 having openings like holes for selectively exposing the surface of the catalytic metal film 300 is provided on the catalytic metal film 300. The insulation film pattern 350 is formed to a thickness of about 1.0–3.0 μm. The insulation film pattern 350 selectively defines positions at which carbon nanotubes 400 will be grown.

The carbon nanotubes 400 grown to be vertically aligned by a chemical vapor deposition method are provided on the catalytic metal film 300 exposed through the openings. The carbon nanotubes 400 are provided for emission of electrons in an electric field. A fluorescent body 800 is provided to face the tips of the carbon nanotubes 400. A transparent electrode 700 is provided on the back of the fluorescent body 800. An upper substrate 600 to which the transparent electrode 700 is attached is mounted on spacers 500 and vacuum sealed with the lower substrate 100. The spacers 500 are mounted on the insulation film pattern 350. Accordingly, the fluorescent body 800 is preferably patterned to expose the portions of the transparent electrode 700 to be supported by the spacers 500.

According to the second embodiment of the present invention, the carbon nanotubes 400 can be grouped, and each group of carbon nanotubes 400 can constitute a single cell.

Figure 12:
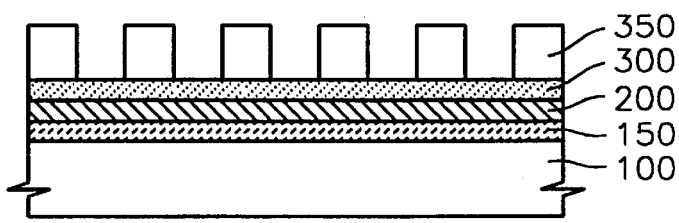
FIG. 12, as part of the group of FIGS. 12–14, is schematic sectional view for explaining a method of fabricating a white light source according to the second embodiment of the present invention.
Figure 13:
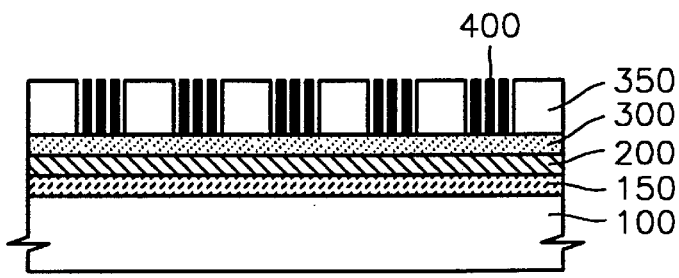
FIG. 13, as part of the group of FIGS. 12–14, is schematic sectional view for explaining a method of fabricating a white light source according to the second embodiment of the present invention.
Figure 14:
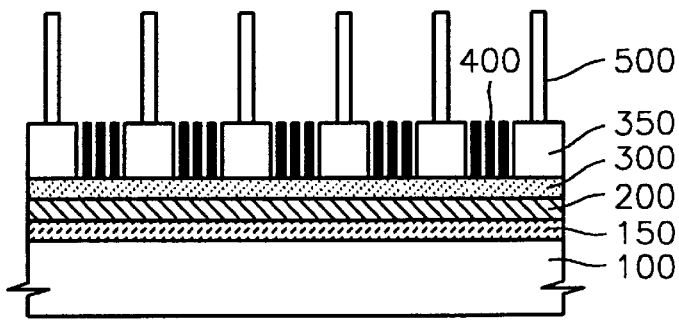
FIG. 14, as part of the group of FIGS. 12–14, is schematic sectional view for explaining a method of fabricating a white light source according to the second embodiment of the present invention.

With reference to FIGS. 12 through 14, an embodiment of a method of fabricating the white light source according to the second embodiment of the present invention will be described in detail.

FIG. 12 schematically shows the step of forming the insulation film pattern 350 on the lower substrate 100. The metal film 200 used as a cathode is thinly formed on the lower substrate 100, which has a large area. The lower substrate 100 may be formed of various materials, as described above, but it preferable that it is formed of glass. The metal film 200 is formed by depositing chrome, titanium, nitride titanium, tungsten or aluminum to a thickness of about 0.3–0.5 μm.

The reaction preventing film 150 may be formed below the metal film 200 to prevent reaction between the metal film 200 and the lower substrate 100. The lower substrate 100 may be formed of silicon, quartz, glass or alumina. When the lower substrate 100 is formed of silicon, the silicon may react with the metal film 200 during a thermal process such as a chemical vapor deposition process for forming the carbon nanotubes in a later process. To prevent this reaction, the reaction preventing film 150 is employed. The reaction preventing film 150 is formed of an insulating material such as silicon oxide to a thickness of about 0.3–0.5 μm.

Thereafter, the catalytic metal film 300, which can serve as a catalyst when growing the carbon nanotubes 400, is formed on the metal film 200. The catalytic metal film 300 is deposited to a thickness of about several nanometers through several hundreds of nanometers, preferably, to about 20–100 nm. The deposition may be performed by a method of forming a thin film such as a thermal deposition method or a sputtering method.

An insulation film is deposited on the catalytic metal film 300 to a thickness of about 1.0–3.0 μm at a low temperature, for example, a temperature below about 500° C. when the lower substrate 100 is formed of glass. This is for preventing deformation of the lower substrate 100 during the step of depositing the insulation film. The insulation film may be formed of various insulating materials. For example, it can be formed on silicon oxide.

Thereafter, the insulation film is patterned by photolithography, thereby forming the insulation film pattern 350 selectively exposing the underlying catalytic metal film 300. For example, a photoresist film (not shown) is deposited to a thickness of about 1.5–2.0 μm and exposed and developed, thereby forming a photoresist pattern selectively exposing the insulation film. Thereafter, the insulation film is selectively etched using the photoresist pattern as an etching mask, thereby forming the insulation film pattern 350 selectively exposing the underlying catalytic metal film 300. The openings of the insulation film pattern 350 may be microscopic holes having a diameter of about 1.0–5.0 μm. The distance between the holes may be 3.0–15.0 μm. Then, the photoresist pattern is removed by a stripping process.

FIG. 13 schematically shows the step of growing the carbon nanotubes 400 to be vertically aligned on the catalytic metal film 300. The vertically aligned carbon nanotubes 400 are selectively grown on the catalytic metal film 300, which is exposed through the openings of the insulation film pattern 350, by chemical vapor deposition, as described with reference to FIGS. 6 through 10. Such carbon nanotubes 400 can be uniformly arranged and vertically grown in lines.

FIG. 14 schematically shows the step of mounting the spacers 500 on the insulation film pattern 350. A plurality of spacers 500 of a length of about 100–700 μm are mounted on the insulation film pattern 350. The spacers 500 serve to separate the fluorescent body 800, to be disposed later, from the tips of the carbon nanotubes 400.

Subsequently, the transparent electrode 700 used as an anode is attached to the transparent upper substrate 600, for example, a glass substrate. The transparent electrode 700 is formed of a transparent conductive material such as ITO. Thereafter, the fluorescent body 800 is attached to the transparent electrode 700. The fluorescent body 800 may be formed of a fluorescent material, for example, $(3Ca_3(PO_4)_2 CaFCl/Sb,Mn)$, generating a white luminescence, or a combination of fluorescent materials including, for example, $Y_2O_3$:Eu, $CeMaA_{11}O_{19}$:Tb and $BaMg_2Al_{16}O_7$:Eu, to generate a white luminescence by combining different emission spectrums.

The separated upper substrate 600 having the fluorescent body 800 and the transparent electrode 700 is mounted on the spacers 500 such that the fluorescent body 800 and the transparent electrode 700 face the tips of the carbon nanotubes 400. Thereafter, the transparent upper substrate 600 and the lower substrate 100 are vacuum sealed.

As described above, the present invention can provide a white light source, with which a large amount of emission current can be attained with a low applied voltage, by using carbon nanotubes with tips having a very small diameter as electric field electron emission tips. In addition, the present invention can provide a white light source exhibiting excellent luminance by using carbon nanotubes which are vertically aligned with a very high density of tips per unit area. Moreover, the processes of fabricating the white light source are simplified, thereby improving the yield and reliability of products. Accordingly, next generation highly efficient power saving white light sources can be provided, replacing existing fluorescent lamps and glow lamps. The white light source according to the present invention can be extremely miniaturized and consumes a small amount of power so that it can be used as a portable white light source.

Although the invention has been described with reference to particular embodiments, it will be apparent to one of ordinary skill in the art that modifications to the described embodiments may be made without departing from the spirit and scope of the invention.

What is claimed is:

1. A method of fabricating a light source, comprising the steps of:

forming a metal film used as a cathode on a lower substrate;

forming a catalytic metal film on the metal film wherein the step of forming the catalytic metal film comprises the steps of:

depositing the catalytic metal film; and grain boundary etching the catalytic metal film to separate the catalytic metal film into nano-sized catalytic metal particles;

growing carbon nanotubes, for emission of electrons in an applied electric field, to be vertically aligned on the catalytic metal film;

mounting spacers on the catalytic metal film; and mounting a transparent upper substrate having a transparent electrode having a fluorescent body on the spacers such that the fluorescent body faces the carbon nanotubes, and sealing the transparent upper substrate with the lower substrate.

2. The method of claim 1, wherein the lower substrate is formed of glass, quartz, alumina or silicon.

3. The method of claim 1, wherein the metal film is formed of chrome, titanium, titanium nitride, aluminum or tungsten.

4. The method of claim 1, further comprising the step of forming a reaction preventing film using an insulating material to prevent reaction between the lower substrate and the metal film, before the step of forming the metal film.

5. The method of claim 1, wherein the grain boundary etching uses ammonia gas as an etching gas.

6. The method of claim 1, wherein the carbon nanotubes are grown from each of the catalytic metal particles to be vertically aligned by chemical vapor deposition.

7. The method of claim 6, wherein the chemical vapor deposition uses a hydrocarbon gas selected from the group consisting of acetylene gas, ethylene gas, propylene gas, profane gas and methane gas.

8. The method of claim 1, wherein the catalytic metal film is formed of cobalt, nickel, iron, yttrium or an alloy of at least two of them.

9. The method of claim 1, further comprising the step of forming an insulation film pattern having openings selectively exposing the catalytic metal film on the catalytic metal film, wherein the carbon nanotubes are selectively located on the portions of the catalytic metal film exposed through the openings, and wherein the spacers are mounted on the insulation film pattern.

10. The method of claim 1 wherein the fluorescent body is formed of $(3Ca_3(PO_4)_2CaFCl/Sb,Mn)$, generating a white luminescence, or a combination of $Y_2O_3$:Eu, $CeMaA_{11}O_{19}$:Tb and $BaMg_2Al_{16}O_7$:Eu, to generate a white luminescence by combining different emission spectrums.

* * * * *